(12) United States Patent
Kim

(10) Patent No.: US 11,440,580 B2
(45) Date of Patent: Sep. 13, 2022

(54) ELECTRIC POWER STEERING APPARATUS AND CONTROL METHOD FOR THE SAME, APPARATUS FOR SYNCHRONIZATION DUAL STEERING MOTOR AND METHOD THEREOF

(71) Applicant: MANDO CORPORATION, Gyeonggi-do (KR)

(72) Inventor: Jung-Yeol Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 325 days.

(21) Appl. No.: 16/425,895

(22) Filed: May 29, 2019

(65) Prior Publication Data

US 2019/0367076 A1    Dec. 5, 2019

(30) Foreign Application Priority Data

Jun. 1, 2018 (KR) .................. 10-2018-0063295
Sep. 6, 2018 (KR) .................. 10-2018-0106595

(51) Int. Cl.
*B62D 5/04* (2006.01)
*B62D 3/04* (2006.01)

(52) U.S. Cl.
CPC .............. *B62D 5/0406* (2013.01); *B62D 3/04* (2013.01); *B62D 5/0463* (2013.01)

(58) Field of Classification Search
CPC ...... B62D 5/0406; B62D 5/04; B62D 5/0463; B62D 5/0481; B62D 5/0487; B62D 3/00; B62D 3/04
See application file for complete search history.

(56) References Cited

U.S. PATENT DOCUMENTS 5,327,986 A * 7/1994 Saita .................. B62D 5/04
                                              180/446
6,929,090 B2 * 8/2005 Furumi ............... B62D 5/04
                                              180/446
(Continued)

FOREIGN PATENT DOCUMENTS

CN    101119884    2/2008
CN    102923183    2/2013
(Continued)

OTHER PUBLICATIONS

Office Action dated Jul. 20, 2021 for Chinese Patent Application No. 201910475664.6 and its English translation from Global Dossier.
(Continued)

*Primary Examiner* — Tony H Winner
(74) *Attorney, Agent, or Firm* — Ladas & Parry, LLP

(57) ABSTRACT

An electric power steering apparatus includes a first motor configured to provide a force for movement of a rack; a second motor configured to provide a force for movement of the rack in synchronized with the first motor; a torque angle sensor configured to detect a torque value and a steering angle according to steering of a steering wheel; at least one sensor configured to detect an operation state of the first motor and an operation state of the second motor; and a controller configured to control the operation of the first motor and the second motor in accordance with the steering of the steering wheel and to control the operation of the first motor and the second motor based on the torque value, the steering angle, the operation state of the first motor and the operation state of the second motor.

20 Claims, 18 Drawing Sheets

(56) References Cited

U.S. PATENT DOCUMENTS

| | | | | |
|---|---|---|---|---|
| 7,789,784 | B2* | 9/2010 | Hayashi | B62D 5/008 |
| | | | | 475/18 |
| 8,360,197 | B2* | 1/2013 | Escobedo | B62D 5/0454 |
| | | | | 180/444 |
| 10,526,004 | B2* | 1/2020 | Witte | B62D 5/04 |
| 2004/0007416 | A1* | 1/2004 | Furumi | B62D 5/0409 |
| | | | | 180/443 |
| 2005/0072621 | A1* | 4/2005 | Hara | B62D 1/163 |
| | | | | 180/444 |
| 2006/0055139 | A1* | 3/2006 | Furumi | B62D 5/04 |
| | | | | 280/93.513 |
| 2015/0375776 | A1 | 12/2015 | Hong | |
| 2018/0244305 | A1 | 8/2018 | Cai et al. | |

FOREIGN PATENT DOCUMENTS

| | | |
|---|---|---|
| CN | 103448789 | 12/2013 |
| CN | 103754256 | 4/2014 |
| CN | 106741147 | 5/2017 |
| CN | 107031707 | 8/2017 |
| CN | 108093676 | 5/2018 |
| DE | 10 2011 118 849 | 5/2013 |
| JP | 2005-67280 | 3/2005 |
| JP | 2011-131756 | 7/2011 |
| JP | 2013-141869 | 7/2013 |
| KR | 10-2011-0006897 | 1/2011 |
| KR | 10-1477855 | 12/2014 |

OTHER PUBLICATIONS

Office Action dated Sep. 5, 2019 for Korean Application No. 10-2018-0106595 and its English machine translation by Google Translate.

Notice of Allowance dated Mar. 9, 2022 for Chinese Patent Application No. 201910475664,6 and its English translation from Global Dossier.

* cited by examiner

FIG.16

| Steering Angle Speed (deg/sec) | Normal Output | |
|---|---|---|
| | Motor Torque (Nm) | Motor RPM |
| 10 | 4.77 | 37.5 |
| 250 | 4.77 | 937.5 |
| 350 | 3.34 | 1312.5 |
| 460 | 2.38 | 1725 |
| 560 | 1.91 | 2100 |

⋮

ELECTRIC POWER STEERING APPARATUS AND CONTROL METHOD FOR THE SAME, APPARATUS FOR SYNCHRONIZATION DUAL STEERING MOTOR AND METHOD THEREOF

CROSS REFERENCE TO RELATED APPLICATION

This application claims priority from Korean Patent Applications No. 10-2018-0063295 filed on Jun. 1, 2018, and No. 10-2018-0106595 filed on Sep. 6, 2018, which are hereby incorporated by reference for all purposes as if fully set forth herein.

BACKGROUND OF THE INVENTION

1. Field of the Invention

The present disclosure relates to an electric power steering apparatus for controlling a current of a dual steering assist motor provided in an electric power steering apparatus, a control method therefor, and an apparatus and method for synchronizing the dual steering assist motor.

2. Description of the Prior Art

In general, a steering apparatus of a vehicle is a device for assisting a driver to travel the vehicle in the desired direction by arbitrarily changing the center of pivot of the vehicle's wheel. Specifically, the electric power steering device is a apparatus enabling of assisting the steering wheel operating force of the driver by using a motor device in the case that the driver operates the steering wheel of the vehicle, thereby easily changing the traveling direction of the vehicle with a smaller force.

Conventional large-sized commercial vehicles mainly use hydraulic power steering devices since they require rigidity that can withstand higher output than ordinary passenger cars. However, with the recent introduction of various driver assistance systems, there is a growing demand to apply driver assist systems (DAS) and electric power steering (EPS) devices to large commercial vehicles.

SUMMARY OF THE INVENTION

For this background, the present disclosure may provide the electric power steering apparatus and a control method thereof capable of efficiently driving a dual steering assist motor by suitably controlling a dual steering assist motor provided in an electric power steering apparatus.

The present disclosure may also provide an electric power steering apparatus and a control method thereof that can operate safely even in the event of a failure of the motor by suitably controlling the dual steering assist motor provided in the electric power steering apparatus.

The present disclosure may also provide the apparatus and method for synchronizing the dual steering assist motor capable of synchronizing two steering assist motors based on RPM difference information of two steering assist motors.

The present disclosure may also provide the apparatus and method for synchronizing the dual steering assist motor capable of improving the steering feeling of a driver by applying an assist torque to the steering assist motor in the case that the steering assist motor cannot output a proper output, and capable of raising the durability of the speed reducer.

In accordance with an aspect of the present disclosure, there is provided an electric power steering apparatus including: a first motor configured to provide a force for movement of a rack; a second motor configured to provide a force for movement of the rack in synchronized with the first motor; a torque angle sensor configured to detect a torque value and a steering angle according to steering of a steering wheel; at least one sensor configured to detect an operation state of the first motor and an operation state of the second motor; and a controller configured to control the operation of the first motor and the second motor in accordance with the steering of the steering wheel and to control the operation of the first motor and the second motor based on the torque value, the steering angle, the operation state of the first motor and the operation state of the second motor.

In accordance with the other aspect of the present disclosure, there is provided a control method of an electric power steering apparatus including: operating a first motor for providing a force for movement of a rack and a second motor for providing a force for movement of the rack in synchronized with the first motor; detecting a torque value and a steering angle according to steering of a steering wheel; detecting an operation state of the first motor and an operation state of the second motor; and controlling the operation of the first motor and the second motor based on the torque value, the steering angle, the operation state of the first motor and the operation state of the second motor.

In accordance with another aspect of the present disclosure, there is provided an apparatus for synchronizing a steering assist motor including: a receiver configured to receive steering angle speed information, first motor RPM information and second motor RPM information for a first motor and a second motor as steering assist motors from a sensor mounted to a vehicle; an abnormality occurrence determiner configured to determine a RPM synchronization of the first motor and the second motor according to the comparison result of the first motor RPM information and the second motor RPM information, to determine an existence of an abnormality occurrence motor, and to determines the abnormality occurrence motor; an additional torque determiner configured to determine, if it is determined that one of the first motor and the second motor is the abnormality occurrence motor, an additional torque to be applied to the abnormality occurrence motor based on at least one of steering angle speed motor output matching table information predetermined for each motor, the first motor RPM information, the second motor RPM information or the steering angle speed information; and a motor current controller configured to control current to be applied to the abnormality occurrence motor based on the additional torque.

In accordance with another aspect of the present disclosure, there is provided a method for synchronizing a steering assist motor including: receiving steering angle speed information, first motor RPM information and second motor RPM information for a first motor and a second motor as steering assist motors from a sensor mounted to a vehicle; determining a RPM synchronization of the first motor and the second motor according to the comparison result of the first motor RPM information and the second motor RPM information, determining an existence of an abnormality occurrence motor, and determining the abnormality occurrence motor; determining, if it is determined that one of the first motor and the second motor is the abnormality occurrence motor, an additional torque to be applied to the abnormality occurrence motor based on at least one of steering angle speed motor output matching table information predetermined for each motor, the first motor RPM information, the second motor RPM information or the steering angle speed information; and controlling current to be applied to the abnormality occurrence motor based on the additional torque.

As described below, according to the present disclosure, it is possible to provide the electric power steering apparatus and a control method thereof capable of efficiently driving a dual steering assist motor by suitably controlling a dual steering assist motor provided in an electric power steering apparatus.

According to the present disclosure, it is also possible to provide the electric power steering apparatus and a control method thereof capable of operating safely even in the event of a failure of a motor by suitably controlling the dual steering assist motor provided in the electric power steering apparatus.

According to the present disclosure, it is also possible to provide the apparatus and method for synchronizing the dual steering assist motor capable of improving the steering feeling of a driver by applying an assist torque to the steering assist motor in the case that the steering assist motor cannot output a proper output, and capable of raising the durability of the speed reducer.

BRIEF DESCRIPTION OF THE DRAWINGS

FIG. 16 is a diagram for explaining an example of the steering angle speed motor output matching table of the additional torque determiner according to the present disclosure;

DETAILED DESCRIPTION OF THE EXEMPLARY EMBODIMENTS

Figure 1:
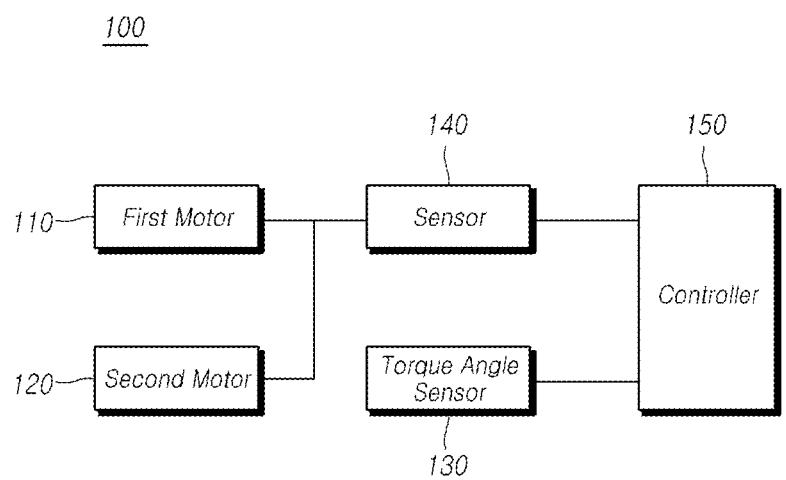
FIG. 1 is a block diagram of the electric power steering apparatus according to the present disclosure.

Hereinafter, embodiments of the present disclosure will be described with reference to exemplary diagrams. In the following description of examples or embodiments, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

The dual steering assist motor synchronizing apparatus in this specification may control steering assist motors in the electronic power steering (EPS) system using two steering assist motors. In particular, the apparatus may perform the function of synchronizing the two steering assist motors if the synchronization of both motors is not performed. In this case, the two steering assist motors are described as the first motor and the second motor, respectively, but the order and names are not limited thereto. Further, in the present specification, the steering assist motor may be expressed simply as a motor.

FIG. 1 is a block diagram of the electric power steering apparatus according to the present disclosure.

Referring to FIG. 1, the electric power steering apparatus 100 according to the present disclosure may include the first motor 110 that provides a force for movement of a rack, the second motor 120 that provides a force for movement of the rack in synchronized with the first motor, the torque angle sensor 130 for detecting the torque value and the steering angle in accordance with the steering of the steering wheel, at least one sensor 140 for detecting the operation state of the first motor and the operation state of the second motor, and the controller 150 for controlling the operation of the first motor and the second motor based on the torque value, the steering angle, and the operation state of the first motor and the second motor so that the wheel is steered in accordance with the steering of the steering wheel.

The first motor 110 may provide the assist steering force for moving the rack to the position where the vehicle is steered to the driver's intention. When the driver operates the steering wheel, the steering angle or the steering torque of the steering wheel is detected and the first motor 110 may be driven under the control of the controller in order to provide the calculated assist steering force based on the detected steering angle or steering torque.

The second motor 120 may also provide the assist steering force for moving the rack to the position where the vehicle is steered to the driver's intention. When the driver operates the steering wheel, the steering angle or the steering torque of the steering wheel is detected and the second motor 120 may be driven under the control of the controller in order to provide the calculated assist steering force based on the detected steering angle or steering torque.

According to an example, the second motor 120 may be driven in synchronized with the first motor 110. For example, the first motor 110 and the second motor 120 may output a force for rotating the single worm wheel in the electric power steering apparatus 100, and the first motor 110 and the second motor 120 may be performed in synchronization with each other.

The torque angle sensor 130 may detect the steering torque and the steering angle generated according to the steering of the vehicle. According to an example, the torque angle sensor 130 may be provided in the worm wheel. However, the position of the torque angle sensor 130 is not limited to a specific position, as long as the torque angle sensor 130 can detect the steering torque and the steering angle at the time of steering the vehicle.

At least one sensor 140 may detect the operation state of the first motor 110 and the operation state of the second motor 120. According to one example, the sensor 140 may be provided in the power supply line that supplies power to each motor.

The sensor 140 may detect the current value flowing through the power supply line and may output the detected current value to the controller 150. However, as an example, at least one of the sensors 140 is not limited to a specific type or position, as long as it can detect whether the operation states of the first motor 110 and the second motor 120 are normal or abnormal.

The controller 150 may control the overall operation of the electric power steering apparatus 100. According to an example, the controller 150 may be implemented as a microcontroller unit (MCU) or an electronic control unit (ECU) or the like. The controller 150 may control the first motor 110 and the second motor 120 in synchronization with each other. The controller 150 may control the currents applied to the first motor 110 and the second motor 120 so that the vehicle wheels are properly steered according to the steering of the steering wheel.

The controller 150 may receive the torque value, the steering angle, the operation state information of the first motor and the operation state information of the second motor from the sensors, and may control the operation of the first motor 110 and the second motor 120 based on the received information. For example, if both the first motor 110 and the second motor 120 are in a normal state and the assist steering force is sufficient to be provided by a single motor, the controller 150 may control the first motor 110 and the second motor 120 to output the assist steering force through only one predetermined motor.

Alternatively, in a state in which only the first motor 110 is operating, if the abnormal state such as fail occurs in the first motor 110, the controller 150 may control to cut off the current supplied to the first motor 110 and supply current to the second motor 120 to provide the assist steering force through the second motor 120.

Alternatively, the controller 150 may control the first motor 110 and the second motor 120 to provide an equal output, depending on the situation. In this case, if a failure occurs in any one of two motors, the controller 150 may control to cut off the supply of electric current to the motor in which the failure occurs and further supply additional current to the other motor to provide the required assist steering force.

As described above, the controller 150 according to the present embodiment may efficiently operate the dual steering assist motor by suitably controlling the dual steering assist motor provided in the electric power steering apparatus. In addition, by controlling the dual steering assist motor provided in the electric power steering device appropriately, it is possible to safely operate the electric power steering device even in the event of a failure or an abnormality of the motor.

Figure 2:
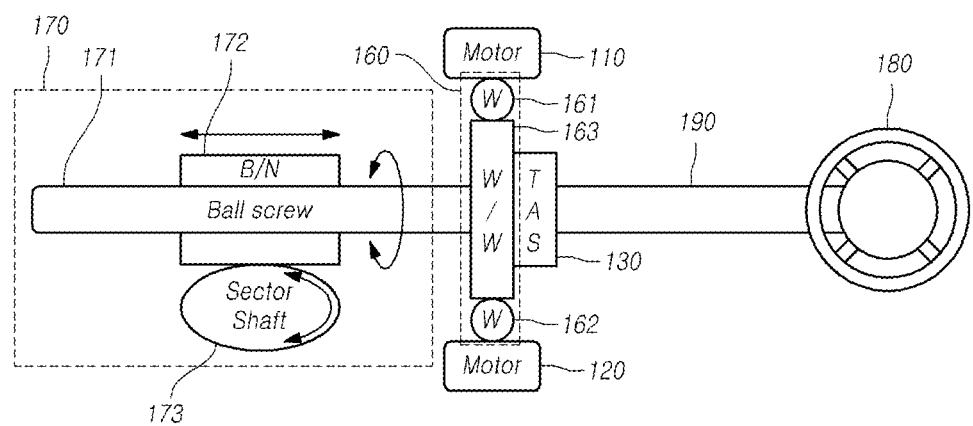
FIG. 2 is a diagram for explaining the operation of the electric power steering apparatus according to the present disclosure.
Figure 3:
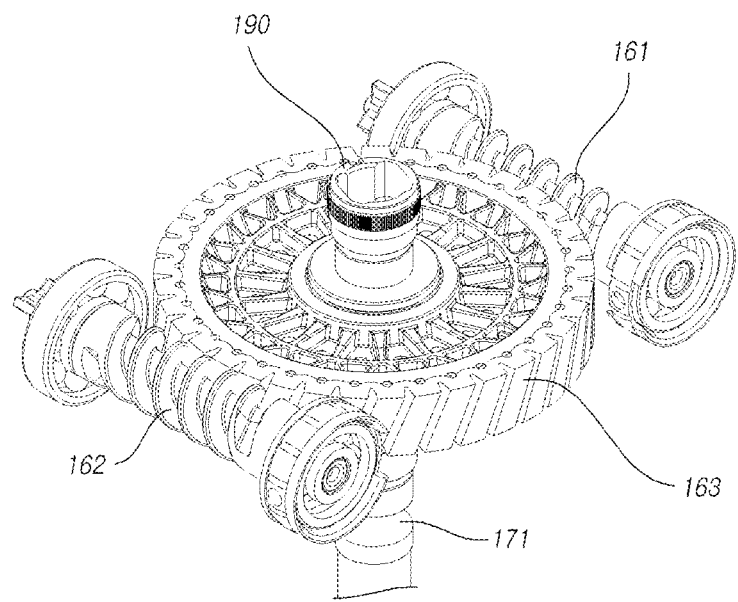
FIG. 3 is a diagram for explaining an engagement structure of a worm and a worm wheel of the electric power steering apparatus according to the present disclosure.

FIG. 2 is a diagram for explaining the operation of the electric power steering apparatus according to the present disclosure, FIG. 3 is a diagram for explaining an engagement structure of a worm and a worm wheel of the electric power steering apparatus according to the present disclosure, and FIGS. 4 to 9 are views for explaining the control of the dual steering assist motor provided in the electric power steering apparatus according to the present disclosure.

Referring to FIG. 2, the electric power steering apparatus 100 may include the first reducer 160 having the power transmission structure by coupling worms 161 and 162 and the worm wheel 163, and the second reducer 170 having the power transmission structure using the ball screw 171 and the ball nut 172 so that the force provided by the first reducer is transmitted to the rack.

In the case that the driver steers the steering wheel 180 to steer the vehicle, the steering shaft 190 is rotated, and the steering torque value and the steering angle may be detected by the torque angle sensor 130. The first motor 110 may be coupled to the first worm 161 to rotate the first worm 161 during operation. The second motor 120 may be coupled to the second worm 162 to rotate the second worm 162 during operation.

The first worm 161 and the second worm 162 may be engaged with the worm wheel 163. In the embodiment of FIG. 3, the first worm 161 and the second worm 162 may be engaged with the worm wheel 163. The rotating shaft of the first motor 110 may be coaxially connected to the first worm 161, and the rotating shaft of the second motor 120 may be coaxially connected to the second worm 162.

According to an example, the first motor 110 and the second motor 120 may be mounted to the same direction side with respect to the first worm 161 and the second worm 162. That is, as illustrated in FIG. 3, if the first motor 110 is coupled to the left end of the first worm 161, the second motor 120 may be also coupled to the left end of the second worm 162 in parallel with the first motor 110. According to one example, the first motor 110 and the second motor 120 may be implemented to be coupled together.

For example, it is assumed that the worm wheel 163 is rotated to rotate in the forward direction if the first worm 161 rotates clockwise according to the driving of the first motor 110. In this case, when the second worm 162 rotates counterclockwise according to the driving of the second motor 120, the worm wheel 163 may be applied with more force in the normal direction, so that the larger assist steering force may be outputted. Conversely, when the second worm 162 is rotated clockwise, the force of the first motor 110 and the force of the second motor 120 act on the worm wheel 163 opposite to each other, so that the assist steering force may be reduced.

Similarly, when the first worm 161 rotates counterclockwise according to the driving of the first motor 110, the worm wheel 163 may be rotated in the opposite direction. In this case, when the second worm 162 rotates clockwise according to the driving of the second motor 120, the worm wheel 163 may receive more force in the opposite direction, so that the larger assist steering force may be output. On the other hand, when the second worm 162 is rotated in the counterclockwise direction, the force of the first motor 110 and the force of the second motor 120 act on the worm wheel 163 opposite to each other, so that the assist steering force in the reverse direction may be reduced.

Referring again to FIG. 2, in the case that the worm wheel is rotated by the first motor 110 and the second motor 120, the ball screw 171 coupled thereto may be rotated. As the ball screw 171 rotates, the ball nut 172 coupled with the ball screw 171 through the ball may slide and move. Since the sector shaft 173 is rotated according to the sliding of the ball nut 172, the pitman arm coupled with the sector shaft 173 can be rotated to provide force to the rack.

The controller 150 may appropriately adjust the current supplied to the first motor 110 and the second motor 120 according to the situation of the vehicle and efficiently supply the assist steering force during the forward steering or the reverse steering. Hereinafter, control operations of the controller 150 for operating the first motor 110 and the second motor 120 in various situations will be described with reference to the related drawings.

According to an example, it is assumed that a required assist steering force required for the vehicle is outputted even if only one of the first motor 110 and the second motor 120 is driven. Hereinafter, it is assumed that only the first motor 110 may be driven. However, this is for convenience of explanation, and the same can be applied to the case in which only the second motor 120 can be driven.

The controller 150 may determine whether the required assist steering force can be provided by operating only the first motor 110 based on the steering torque value and the steering angle detected by the torque angle sensor 130. According to one example, the controller 150, if necessary, may further utilize the state information of the vehicle detected by the vehicle speed sensor, the yaw rate sensor, the pressure sensor, or other sensors, or the state information outside the vehicle.

Figure 4:
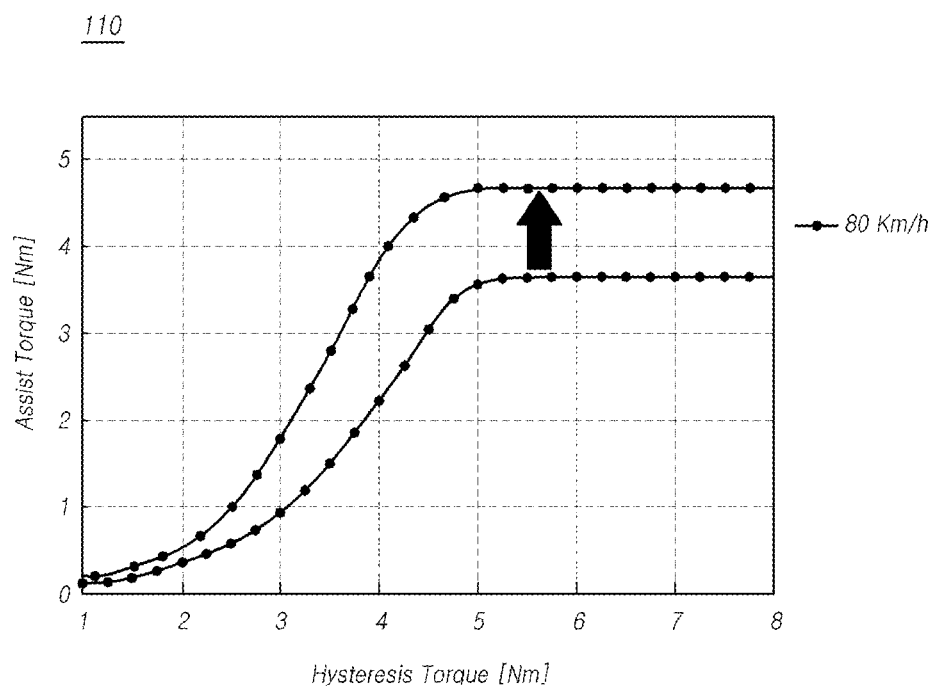
FIGS. 4 to 9 are views for explaining the control of the dual steering assist motor provided in the electric power steering apparatus according to the present disclosure.

If it is sufficient to operate only the first motor 110, the controller 150 may control to drive only the first motor 110 by increasing the assist torque for the first motor 110 while reducing the current supplied to the second motor 120. FIG. 4 illustrates a graph for the assist steering torque of the first motor 110 in the case of 80 km/h of the vehicle speed. The controller 150 may increase the current supplied to the first motor 110 to the greater value than the case in which the second motor 120 is also driven together with the first motor 110 so as to increase the assist torque of the first motor 110.

In this manner, only one of the two steering assist motors provided in the dual steering assist motor is driven according to the situation of the vehicle, so that the electric power steering apparatus can efficiently operate.

According to another example, it is assumed that a failure or an abnormality occurs in the first motor 110 during operation of the first motor 110 and the second motor 120. This may include a case in which the failure occurs in the first motor 110 while only the first motor 110 is operating.

Figure 5:
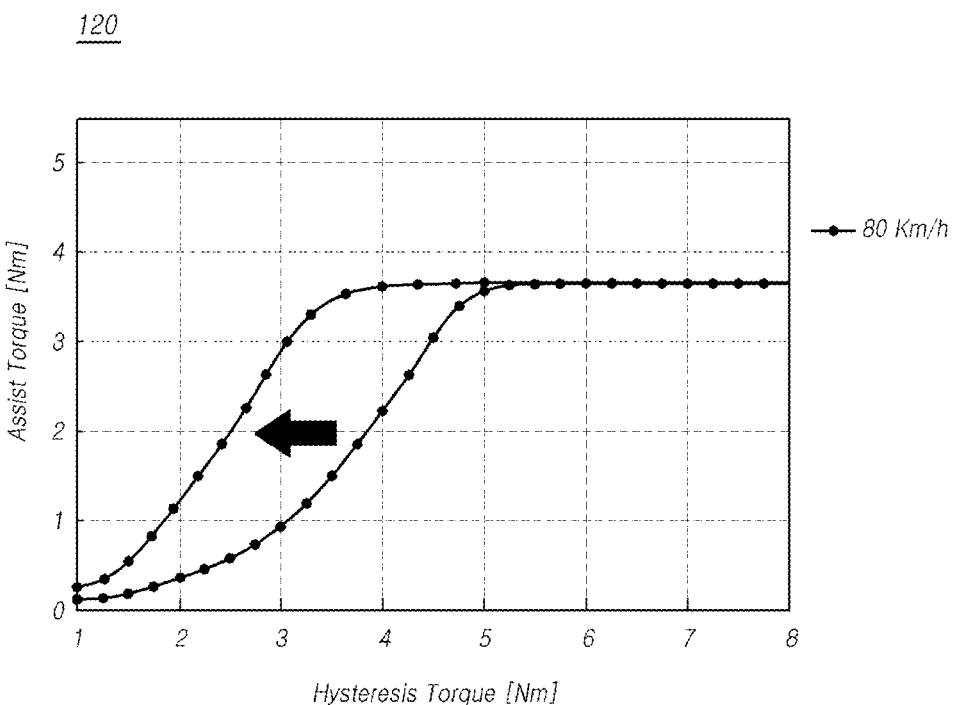

As illustrated in FIG. 5, if the operation state of the first motor 110 is detected as the failure or the abnormality by the sensor 140, the controller 150 may control to increase the assist steering torque in the on-center region for the second motor 120. To this end, the controller 150 may ramp up or exponentially increase the current applied to the second motor 120.

Figure 6:
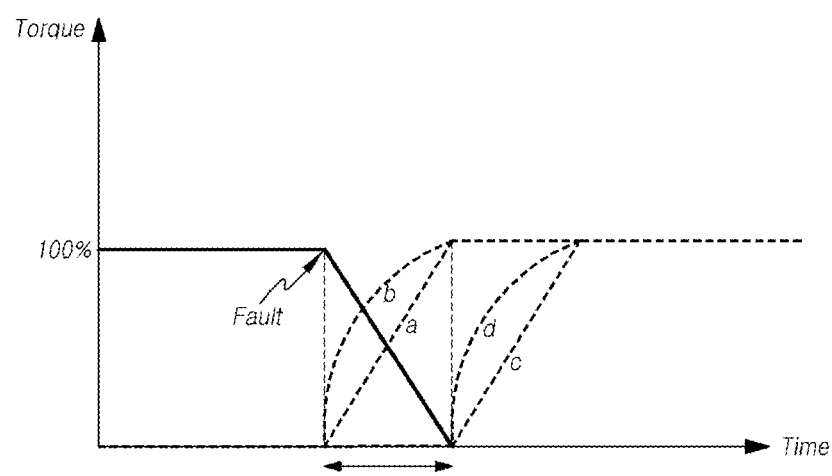

Referring to FIG. 6, the solid line indicates the assist steering torque of the first motor 110, and the dotted line indicates the assist steering torque of the second motor 120. If the failure or the abnormality of the first motor 110 occurs, the assist steering torque by the first motor 110 gradually may decrease. Accordingly, the controller 150 can increase the current supplied to the second motor 120.

In this case, according to an example, the current supplied to the second motor 120 may be increased in a ramp-up manner (a). Alternatively, according to another example, the current supplied to the second motor 120 may be exponentially increased according to the manner (b).

According to an example, the controller 150 may increase the current applied to the second motor 120 in the case that the output of the first motor 110 is extinguished. That is, referring to FIG. 6, the current supplied to the second motor 120 may be increased according to the ramp-up manner (c) if the output from the first motor 110 is lost, that is, if the output torque from the first motor 110 becomes zero. Alternatively, the current supplied to the second motor 120 may be increased in an exponential manner (d) if the output of the first motor 110 is extinguished.

According to this manner, in the case that a failure occurs in one of the motors that is being driven, the assist torque of the other motor may be rapidly increased, so that the electric power steering apparatus can stably operate.

According to an example, it is assumed that an abnormality occurs in the first motor 110 and the output torque from the first motor 110 decreases during operation of the first motor 110 and the second motor 120. This may include the case in which the output of the first motor 110 is reduced while only the first motor 110 is operating.

Figure 7:
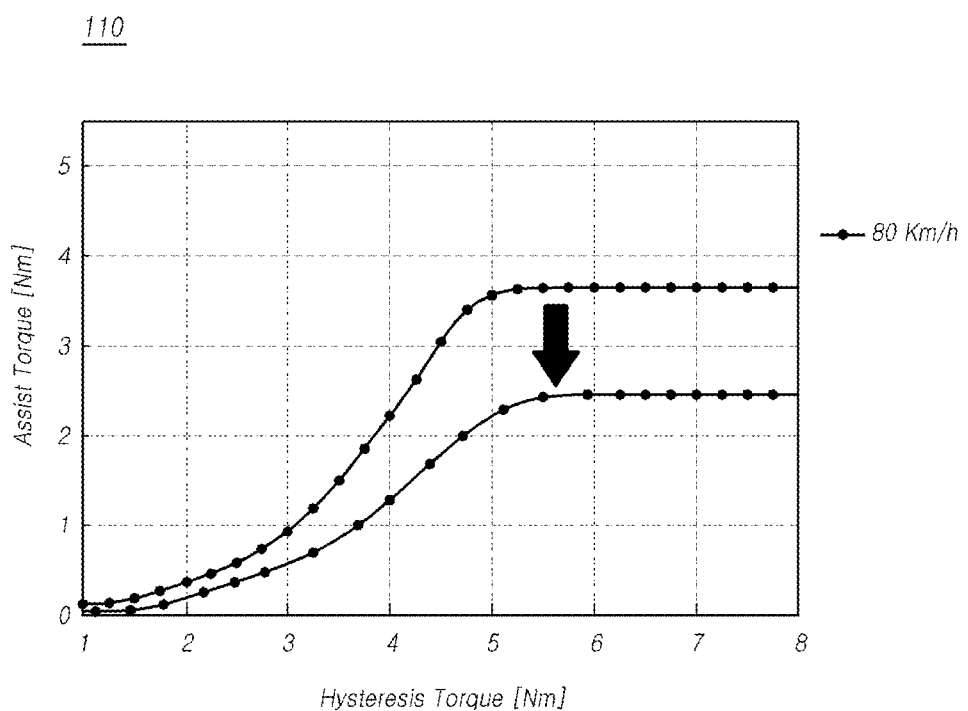

If the output of any one motor of the first motor 110 and the second motor 120 is decreased, the controller 150 may increase the current supplied to the other motor to increase the output. If the abnormality occurs in the first motor 110, as shown in FIG. 7, the assist torque to the first motor 110 may be reduced. That is, the first motor 110 may be capable of outputting a constant amount of assist torque unlike the state where the first motor 110 is completely failed illustrated in FIG. 5.

Figure 8:
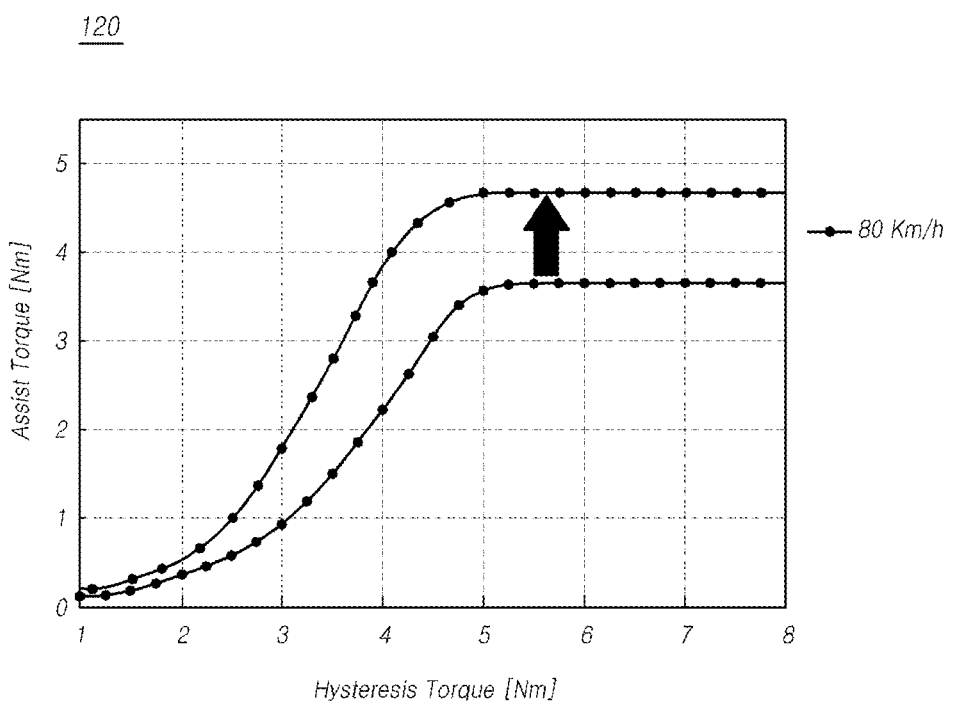

In this case, the controller 150 can increase the assist torque to the second motor 120, as shown in FIG. 8. The increase value of the assist torque can be calculated to a value capable of compensating for the shortage of the required assist steering force generated by the abnormality of the first motor 110. The controller 150 may ramp up or exponentially increase the current applied to the second motor 120 to further output the calculated increase value.

Figure 9:
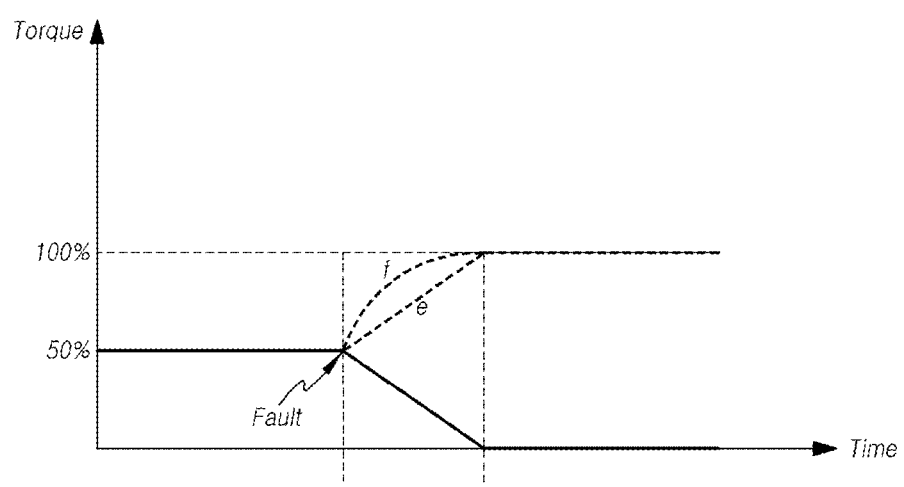

Referring to FIG. 9, the solid line represents the assist torque of the first motor 110, and the dotted line represents the assist torque of the second motor 120. If the abnormality occurs in the first motor 110, the assist torque by the first motor 110 gradually decreases. Accordingly, the controller 150 can increase the current supplied to the second motor 120. In FIG. 9, the assist torque by the first motor 110 is illustrated to be zero according to the time lapse, but is not limited thereto. If the assist torque by the first motor 110 is reduced to a predetermined value and then maintained, the controller 150 may control so as to maintain the assist torque by the second motor 120 to a constant value without further increasing the assist torque by the second motor 120.

In this case, according to an example, the current supplied to the second motor 120 may be increased in a ramp-up manner (e). Alternatively, according to another example, the current supplied to the second motor 120 may be increased in an exponential increase manner (f).

According to this manner, if the abnormality occurs in one of the motors in operating, the assist steering torque of the other motor may be increased and compensated, so that the electric power steering apparatus can stably operate.

Furthermore, by controlling the dual steering assist motor provided in the electric power steering device suitably for the situation, the dual steering assist motor can be efficiently driven. In addition, it is possible to operate safely even in the event of failure of the motor by properly controlling the dual steering assist motor provided in the electric power steering according to the situation.

Figure 10:
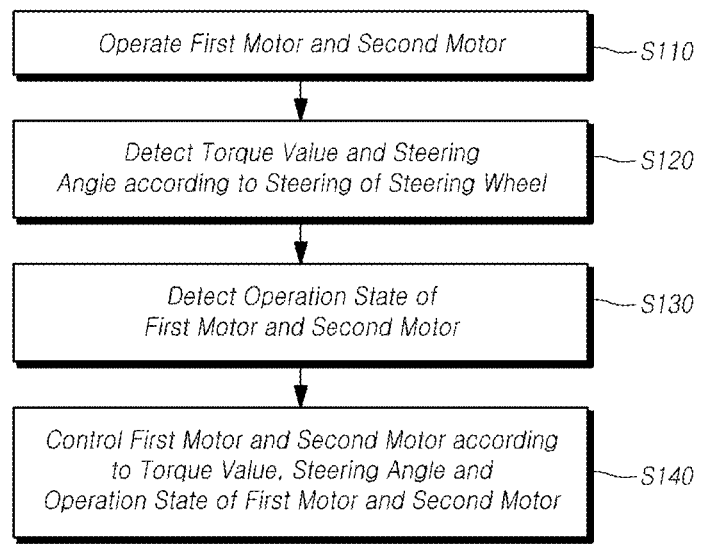
FIG. 10 is a flowchart of a control method of the electric power steering apparatus according to the present disclosure.
Figure 11:
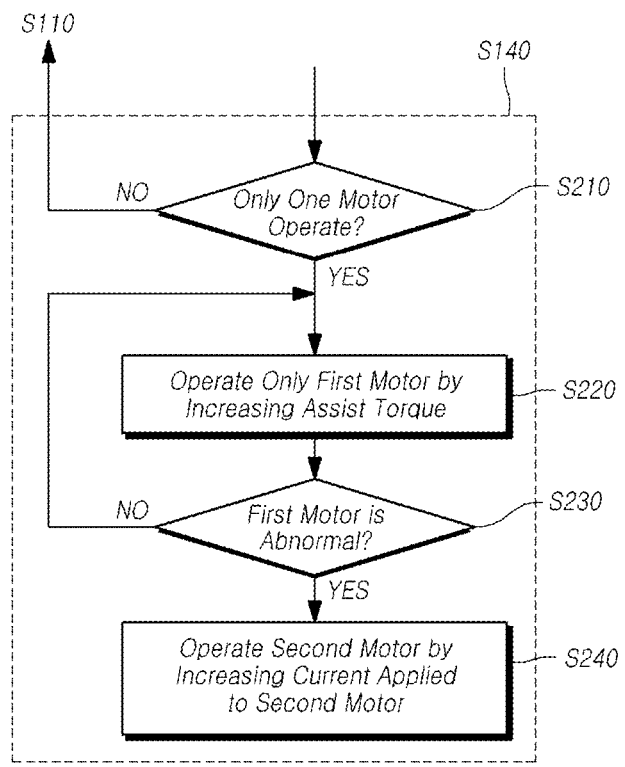
FIG. 11 is a flowchart for explaining a control method when the motor in operation is in abnormal state in the case that one motor according to the present disclosure operates.
Figure 12:
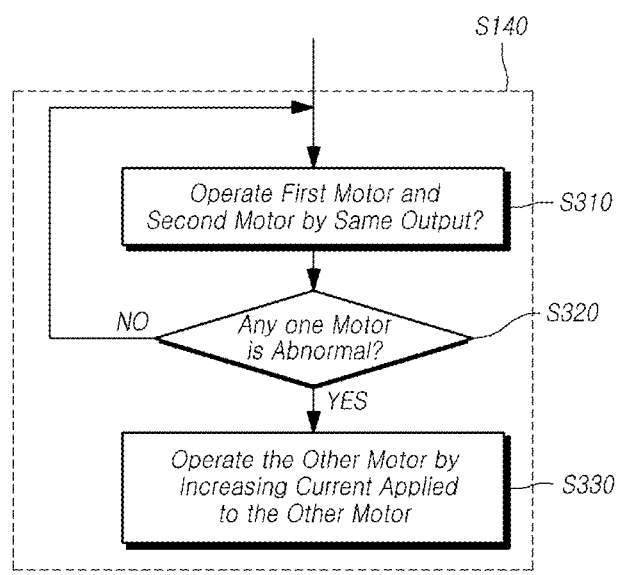
FIG. 12 is a flowchart for explaining a control method when any one motor is in abnormal state in the case that two motors according to the present disclosure operate.

FIG. 10 is a flowchart of a control method of the electric power steering apparatus according to the present disclosure, FIG. 11 is a flowchart for explaining a control method when the motor in operation is in abnormal state in the case that one motor according to the present disclosure operates, and FIG. 12 is a flowchart for explaining a control method when any one motor is in abnormal state in the case that two motors according to the present disclosure operate.

The control method of the electric power steering apparatus according to the present disclosure can be implemented in the electric power steering apparatus 100 described with reference to FIG. 1. Hereinafter, the control method of the electric power steering apparatus according to the present disclosure and the operation of the electric power steering apparatus 100 for implementing the same will be described in detail with reference to the related drawings.

Referring to FIG. 10, the electric power steering apparatus may control the operation of the first motor providing the force for movement of the rack and the second motor providing the force for movement of the rack in synchronized with the first motor so that the vehicle wheel is steered in accordance with the steering of the steering wheel [S110].

The first motor 110 may provide the assist steering force required for moving the rack to the steering position in accordance with the driver's intention. If the driver operates the steering wheel, the steering angle of the steering wheel is detected. The first motor 110 may be driven under control of the controller to provide the calculated assist steering force based on the detected steering angle.

The second motor 120 may provide the assist steering force required for moving the rack to the steering position in accordance with the driver's intention. If the driver operates the steering wheel, the steering angle of the steering wheel is detected. The second motor 120 may be driven under control of the controller to provide the calculated assist steering force based on the detected steering angle.

According to an example, the second motor 120 may operate in synchronized with the first motor 110. The first motor 110 and the second motor 120 can output the force for rotating the same single worm wheel in the electric power steering apparatus 100. Accordingly, the first motor 110 and the second motor 120 may be performed in synchronization with each other.

The controller 150 included in the electric power steering apparatus may control the first motor 110 and the second motor 120 in synchronization with each other. The controller 150 may control the currents applied to the first motor 110 and second motor 120 so that the vehicle wheels are appropriately steered according to the steering of the steering wheel.

Referring again to FIG. 10, the electric power steering apparatus may detect the steering torque value and the steering angle according to steering of the steering wheel [S120].

The torque angle sensor 130 may detect the steering torque and the steering angle generated according to the steering of the vehicle. According to an example, the torque angle sensor 130 may be provided in the worm wheel. However, the position of the torque angle sensor 130 is not limited to a specific position, as long as the torque angle sensor can detect the steering torque and the steering angle at the time of steering the vehicle. In the present specification, the steering torque may simply be expressed as the torque or the torque value.

Referring again to FIG. 10, the electric power steering apparatus can detect the operation states of the first motor and the second motor [S130].

At least one sensor 140 may detect the operation state of the first motor 110 and the operation state of the second motor 120. According to one example, the sensor 140 may be provided in the power supply line that supplies power to each motor. The sensor 140 may detect the current value flowing through the power supply line and may output the detected current value to the controller 150. However, as an example, at least one of the sensors 140 is not limited to a specific type or position, as long as the sensor can detect whether the operation states of the first motor 110 and the second motor 120 are normal or abnormal.

Referring again to FIG. 10, the electric power steering apparatus may control the driving or the operation of the first motor and the second motor based on the steering torque value, the steering angle, the operation state of the first motor and the second motor [S140].

The controller 150 of the electric power steering apparatus may receive the signal or information corresponding to the torque value, the steering angle, the operation state of the first motor and the second motor from the sensors, and may control the operation of the first motor 110 and the second motor 120 in accordance with the situation based on the received information. For example, if the first motor 110 and the second motor 120 are in the normal state and the assist steering force is sufficient to be provided only by one motor, the controller 150 may control the first motor 110 and the second motor 120 to provide the assist steering force by driving only one predetermined motor among the first motor 110 and the second motor 120.

Alternatively, if the failure occurs in the first motor 110 while only the first motor 110 is operating, the controller 150 may cut off the current supplied to the first motor 110, and may supply current to the second motor 120 to provide the assist steering force only through the second motor 120.

Alternatively, the controller 150 may control the first motor 110 and the second motor 120 to provide an equal output, depending on the situation. In this case, if the failure occurs in any one of the motors, the controller 150 may control to stop the supply of electric current to the motor in which the failure occurs and further supply additional current to the other motor to provide the required assist steering force.

According to this manner, the dual steering assist motor can be sufficiently driven by controlling the dual steering assist motor provided in the electric power steering apparatus according to the situation. Furthermore, it is possible to safely operate the dual steering assist motor provided in the electric power steering apparatus even in the event of failure of the motor.

Hereinafter, the details of the method of controlling the operation of the first motor 110 and the second motor 120 (step S140) in various situations will be described with reference to the related drawings.

Referring to FIG. 11, the controller 150 of the electric power steering apparatus may determine whether the required assist steering force can be provided sufficiently only by the operation of the first motor 110 based on the torque value and the steering angle detected by the torque angle sensor 130 [S210]. According to one example, the controller 150 may further utilize the state information of the vehicle and the state information outside the vehicle detected by the vehicle speed sensor, the yaw rate sensor, the pressure sensor, or other sensors, if necessary.

If the required assist steering force cannot be provided by only driving the first motor 110 (S210, NO), the controller 150 may control both the first motor 110 and the second motor 110 to provide the required assist steering force [S110].

Referring again to FIG. 11, if only the first motor 110 is to be driven (S210, YES), the controller 150 may being decreasing the current supplied to the second motor 120, and may control only the first motor 110 to be driven by increasing the assist torque to the first motor 110 [S220]. In this case, since the larger output is required than when the first motor is driven together with the second motor 120, the controller 150 may further increase the current supplied to the first motor 110 to increase the assist torque of the first motor 110.

Next, it is assumed that the failure occurs in the first motor 110 during the operation of the first motor 110 and the second motor 120. This may include the case where the failure occurs in the first motor 110 while only the first motor 110 is operating.

Referring again to FIG. 11, the controller 150 may determine whether the first motor 110 is in abnormal state including the failure by using the information detected by the sensor 140 [S230]. The controller 150 may control to drive only the first motor 110 or to drive both the first motor 110 and the second motor 120 in the case that the operation state of the first motor 110 is not abnormal state (S230, NO).

If the operation state of the first motor 110 is detected as the abnormal state or the failure state (S230, YES), the controller 150 may increase the assist torque of the on-center region for the second motor 120. To this end, the controller 150 may ramp up or exponentially increase the current applied to the second motor 120 [S240].

If the abnormality of the first motor 110 occurs, the assist torque by the first motor 110 gradually decreases. Accordingly, the controller 150 may increase the current supplied to the second motor 120. In this case, according to one example, the current supplied to the second motor 120 may be increased in the ramp-up manner. Alternatively, according to another example, the current supplied to the second motor 120 may be increased in the exponential manner.

According to an example, the controller 150 may increase the current applied to the second motor 120 in the time when the output of the first motor 110 is extinguished. The current supplied to the second motor 120 can be increased in a ramp-up manner when the output of the first motor 110 becomes zero or the output of the first motor 110 is lost. Alternatively, the current supplied to the second motor 120 may be increased in an exponential manner when the output of the first motor 110 is lost or the output of the first motor 110 becomes zero.

According to this manner, even if one motor in operating become completely not operated state, the electric power steering apparatus can operate stably by rapidly increasing the assist torque of another motor.

Referring to FIG. 12, the controller 150 of the electric power steering apparatus may control the first motor 110 and the second motor 120 to provide the same output [S310].

During the operation of the first motor 110 and the second motor 120, the controller 150 may determine whether any one of the motors is abnormal state [S320]. This may include a case in which the output of the first motor 110 is reduced while only the first motor 110 is being driven.

If abnormality has not occurred in any one of the motors (NO at S320), the controller 150 may drive the first motor 110 and the second motor 120.

If the output of any one motor of the first motor 110 and the second motor 120 is decreased (S320, YES), the controller 150 may increase the output steering torque by increasing the current supplied to the other motor [S330]. If the abnormality occurs in the first motor 110, the assist torque by the first motor 110 may be reduced. That is, this means that the first assist motor 110 can output a certain amount of assist torque unlike the state in which the first motor 110 is completely failed.

In this case, the controller 150 may increase the assist torque to the second motor 120. The increase value of the assist torque can be calculated to a value that can compensate for the shortage of the required assist steering force generated by the abnormality of the first motor 110. The controller 150 may ramp up or exponentially increase the current applied to the second motor 120 so as to further output the calculated increase value of the assist torque.

If the abnormality occurs in the first motor 110, the assist torque by the first motor 110 gradually decreases. Accordingly, the controller 150 may increase the current supplied to the second motor 120. If the assist torque by the first motor 110 is reduced to a predetermined value and then maintained, the controller 150 may control the assist torque by the second motor 120 to maintain a constant value without further increasing the assist torque by the second motor 120.

In this case, according to an example, the current supplied to the second motor 120 may be increased in the ramp-up manner. Alternatively, according to another example, the current supplied to the second motor 120 may be increased in an exponential manner.

According to this manner, even if the abnormality occurs in one of the motors in operating, the assist steering torque by the other motor may be increased and compensated, so that the electric power steering apparatus can operate stably.

Furthermore, the dual steering assist motor can be sufficiently driven by controlling the dual steering assist motor provided in the electric power steering apparatus according to the situation. Furthermore, it is possible to safely operate the dual steering assist motor provided in the electric power steering apparatus even in the event of failure of the motor.

Hereinafter, the dual steering assist motor synchronizing apparatus and method according to the present disclosure capable of performing the functions of the controller provided in the electric power steering apparatus will be described with reference to the drawings.

Figure 13:
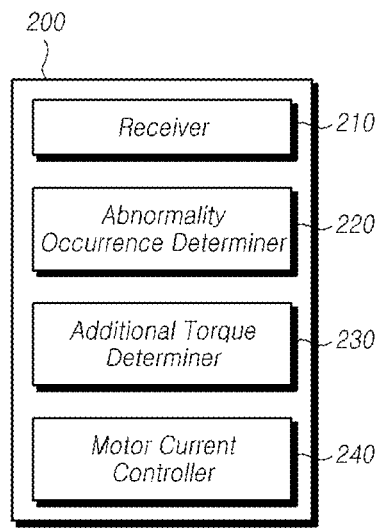
FIG. 13 is a diagram for explaining a configuration of a dual steering assist motor synchronizing apparatus according to the present disclosure.

FIG. 13 is a diagram for explaining a configuration of a dual steering assist motor synchronizing apparatus according to the present disclosure.

Referring to FIG. 13, the dual steering assist motor synchronizing apparatus 200 may be included in the electric power steering apparatus described with reference to FIGS. 1 to 12. The dual steering assist motor synchronizing apparatus 200 may include the receiver 120 to receive steering angle speed information, first motor RPM information 112 and second motor RPM information 122 for a first motor 110 and a second motor 120 as steering assist motors from the steering angle sensor, RPM sensor mounted to the vehicle, the abnormality occurrence determiner 220 to determine the RPM synchronization of the first motor 110 and the second motor 120 according to the comparison result of the first motor RPM information and the second motor RPM information, to determine the existence of an abnormality occurrence motor, and to determines the abnormality occurrence motor, the additional torque determiner 230 to determine, if it is determined that one of the first motor 110 and the second motor 120 is the abnormality occurrence motor, the additional torque to be applied to the abnormality occurrence motor based on at least one of steering angle speed motor output matching table information predetermined for each motor, the first motor RPM information, the second motor RPM information or the steering angle speed information; and the motor current controller 240 to control current to be applied to the abnormality occurrence motor based on the additional torque.

The receiver 210 of the dual steering assist motor synchronizing 200 according to one embodiment may receive the steering angle speed information, the RPM information of the first motor 110 and the second motor 120 from the steering angle speed sensor or the RPM sensor or the steering assist motor mounted in the vehicle. In this case, the RPM sensor of the steering assist motor may be an encoder installed in the motor. The encoder can detect the rotational speed, rotational direction and the like of the first motor 110 and the second motor 120.

In addition, according to one embodiment, a plurality of sensors may be provided inside or outside the vehicle for generating the information received by the receiver 210. In addition, the sensor may be a preliminary sensor for a sensor error or sensor failure of the sensor in the vehicle. The steering angle speed or the first motor RPM information 112 and the second motor RPM information 122 received by the receiver 210 may be not information directly received from the sensors but an estimated value information calculated using another sensor.

Alternatively, the receiver 210 may calculate the steering angle speed information or the RPM information using the information received from the sensor. For example, the receiver 210 may, in the event of an error or failure of the steering angle speed sensor, utilize the calculated steering angle speed information calculated by estimating the driver steering angle speed information using the RPM information received from the RPM sensor of the steering assist motor. Alternatively, the receiver 210 may, in the event of an error or failure of the RPM sensor of the steering assist motor, utilize the calculated RPM information calculated by estimating the RPM information of the steering assist motor by using the steering angle speed information received from the steering angle speed sensor. In addition, the information received by the receiver 210 according to an exemplary embodiment may include steering angle information, steering angle holding time information, driver steering torque information, steering assist motor torque information, and the like, as well as steering angle speed information or RPM information.

The abnormality occurrence determiner 220 according to an embodiment may determine RPM synchronization of the first motor 110 and the second motor 120 based on a result of comparing the first motor RPM information and the second motor RPM information. In addition, the abnormality occurrence determiner 220 may determine whether or not an abnormality occurrence motor exists and determine the abnormality occurrence motor. That is, in the EPS system using the dual steering assist motor, the steering assist force according to the driver's steering may be provided by both motors, and each of the two steering assist motors may provide half of the output for the steering assist force. Therefore, the abnormality occurrence determiner 220 may compare the RPM information of the two motors, and determine the steering assist motor having less RPM information as the abnormality occurrence motor.

For example, the abnormality occurrence determiner 220 may compare the first motor RPM information and the second motor RPM information, and if the one of the RPM information has a value less than the other one, the abnormality occurrence determiner 220 may determine the steering assist motor corresponding to the RPM information having the small value as the abnormality occurrence motor. That is, if it is determined that the first motor RPM information exceeds the second motor RPM information, the abnormality occurrence determiner 220 determines the second motor 120 as the abnormality occurrence motor, and if the information is less than or equal to the motor RPM information, the first motor 110 may be determined to be the abnormality occurrence motor.

At this time, if any one of the steering assist motor RPM information has a lower value than the RPM information of the other steering assist motor, it means that the output of the steering assist motor having low RPM information is reduced due to an abnormal factor such as internal heat or the steering assist motor having low RPM information is delay driven. Alternatively, if the steering assist motor RPM information has a lower value than the RPM information of the other steering assist motor, it may mean that the steering assist motor having low RPM information is delayed driven due to the increase in disturbance or gear teeth clearance of the motor. The operation of the abnormality occurrence determiner 220 will be described later in more detail with reference to FIG. 15.

Further, if it is determined that the abnormality has occurred in any one of the first motor 110 and the second motor 120, the additional torque determiner 230 according to an embodiment may determine the additional torque to be applied to the abnormality occurrence motor based on at least one of steering angle speed motor output matching table information predetermined for each motor, the first motor RPM information, the second motor RPM information or the steering angle speed information. That is, based on the torque information of the motor, the RPM information of the motor to be outputted when there is no abnormality in the steering assist motor, and the detected RPM information of both motors, the additional torque determiner 230 may further apply the additional torque corresponding to the difference between the torque to be applied in the absence of abnormality and the actual generated torque to the abnormality occurrence motor.

This allows the dual steering assist motor synchronizing apparatus 200 to perform synchronization of both motors, since the RPM of the two steering assist motors can be maintained at the same value.

At this time, the steering angle speed motor output matching table information of the additional torque determiner 230 may include normal motor output torque information and normal motor output RPM information mapped by each steering angle speed which may be generated in the vehicle. Since the EPS system is a system for providing the steering assist force according to the driver's steering, the normal motor output torque information and the normal motor output RPM information to be outputted from the steering assist motor can be assigned according to the steering angle speed. the steering angle speed motor output matching table information of the additional torque determiner 230 may be a table in which the output information to be output from the steering assist motor is matched and assigned according to the steering angle speed information. In this case, the output information to be output from the steering assist motor in accordance with the steering angle speed information may differ depending on the characteristics of the steering assist motor, so that the steering angle speed motor output matching table information may differ depending on the characteristics of the steering assist motor.

The additional torque determiner 230 according to one embodiment may be configured to determine the additional torque such that the RPM information output from the abnormality occurrence motor is matched with the normal motor output RPM information mapped to the steering angle speed information based on the steering angle speed motor output matching table information. As a result, the RPM information of the abnormality occurrence motor and the normal motor become the same, so that the dual steering assist motor synchronizing apparatus 200 can synchronize the two steering assist motors.

In addition, the additional torque determiner 230 according to one embodiment may be configured to verify the normal motor output RPM information and the normal motor output torque information corresponding to the steering angle speed information using the steering angle speed motor output matching table information of the abnormality occurrence motor, and to calculate RPM difference information which is a difference between the first motor RPM information and the second motor RPM information and determines the additional torque based on the RPM difference information. In one embodiment, the additional torque determiner 230 may determine the additional torque that may be the normal motor output RPM information and the normal motor output torque information based on the RPM difference information. In this way, the RPM synchronization of the abnormality occurrence motor and the normal motor can be performed by using the difference information between the abnormality occurrence motor and the normal motor.

For example, the additional torque determiner 230 according to one embodiment may determine the additional torque as the value multiplying the value obtained by dividing the RPM difference information by the normal motor output RPM information into the normal motor output torque information. Alternatively, the additional torque determiner 230 may determine the additional torque using a predetermined relational function having at least one of the RPM difference information, the normal motor output RPM information, and the normal motor output torque information as the variables. Determination of the additional torque of the additional torque determiner 230 will be described later in more detail with reference to FIG. 16 and FIG. 17.

The motor current controller 240 according to the embodiment may control the current to be supplied to the abnormality occurrence motor based on the additional torque information. Since the additional torque determiner 230 according to the embodiment determines the additional torque to be applied to the steering assist motor, the motor current controller 240 may supply the current to the abnormality occurrence motor so as to directly synchronize the two steering assist motors.

In this case, the motor current controller 240 according to the embodiment may convert the additional torque into an additional current to be applied to the abnormality occurrence motor by using a predetermined conversion value for the vehicle and supply the additional current to the abnormality occurrence motor. The additional torque determiner 230 according to the embodiment determines the additional torque of the steering assist motor using the unit of the torque amount. Therefore, the motor current controller 240 is required to convert the additional torque into an amount of current to supply the current to the steering assist motor based on the inherent characteristics of the steering assist motor and the inherent characteristics of the vehicle. For example, the predetermined conversion value may be a torsion bar constant. That is, the additional torque can be converted to an additional current by using the torsion bar constant. In this case, the motor current controller 240 may apply the converted additional current to the abnormality occurrence motor. However, the predetermined conversion value may be a different value as long as the additional torque information can be converted into the additional current by reflecting the inherent characteristic of the vehicle.

According to this manner, the motor current controller 240 may synchronize the two steering assist motors by matching the RPM information and the torque information of the abnormality occurrence motor with the normal motor output torque information and the normal motor output RPM information.

The dual steering assist motor synchronizing apparatus 200 or the receiver 210, the abnormality occurrence determiner 220, the additional torque determiner 230, and the motor current controller 240 included in the dual steering assist motor synchronizing apparatus 200 may be implemented as an electric power steering apparatus for the vehicle or an a partial modules of an ECU therefor.

The electric power steering apparatus or the ECU may include a processor, storage such as and a memory and a computer program capable of performing a specific function. The receiver 210, the abnormality occurrence determiner 220, the additional torque determiner 230 and the motor current controller 240 may be implemented as software modules capable of performing their respective functions.

The dual steering assist motor synchronizing apparatus 200 according to the present embodiment may be implemented as a computer system connected to the antenna system. The computer system may include one or more element of processors, a memory, the storage, a user interface input and a user interface output, which are capable of communicating with one another via a communication bus.

In addition, the computer system may also include a network interface for connecting to a network.

The processor may be a CPU or a semiconductor device that executes processing instructions stored in memory and/or in the storage. Memory and storage may include various types of volatile/non-volatile storage media. For example, the memory may include ROM and RAM.

In dual steering assist motor synchronizing apparatus 200 having such a hardware configuration, a software or a program for performing the functions of the receiver 210, the abnormality occurrence determiner 220, the additional torque determiner 230 and the motor current controller 240 may be stored or installed in the memory or the storage unit, and may be executed by the processor.

As described above, the configuration of the dual steering assist motor synchronizing apparatus 200 and the operation of each configuration have been schematically described. Hereinafter, a specific operation method of each configuration of the dual steering assist motor synchronizing apparatus 200 will be described in detail with reference to FIG. 14 to FIG. 17.

Figure 14:
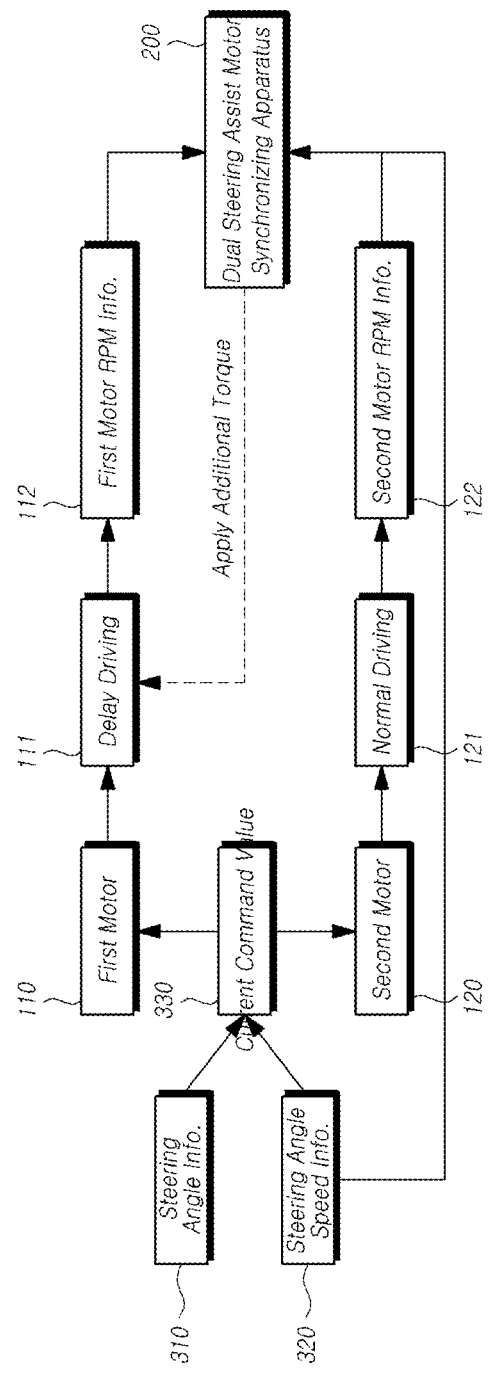
FIG. 14 is a diagram for explaining an operation in which the dual steering assist motor synchronizing apparatus according to the present disclosure is applied in the vehicle.

FIG. 14 is a diagram for explaining an operation in which the dual steering assist motor synchronizing apparatus according to the present disclosure is applied in the vehicle.

Referring to FIG. 14, the dual steering assist motor synchronizing apparatus 200 may receive the RPM information of the delayed motor, i.e., the abnormality occurrence motor, the RPM information of the normally driven motor, and the steering angle speed information, and may perform the synchronization of the steering assist motor by applying the additional torque to the abnormality occurrence motor which is delay driven based on the received information.

Specifically, if the steering wheel is steered by the driver of the vehicle, the steering angle information 310 and the steering angle speed information 320 may be generated. Since the EPS system applies the assist steering force to the driver's steering force using the steering assist motor, the magnitude of the steering assist force to be provided by the steering assist motor may be determined based on the steering angle information 310 and the steering angle speed information 320. The EPS system may calculate the current command value 330 for the steering assist motor corresponding to the steering assist force and apply the current command value 330 to the steering assist motor.

In this case, the EPS system of the dual steering assist motor comprising the first motor 110 and the second motor 120 as the steering assist motor, may provide the current command value 330 to the first motor 110 and the second motor 120, respectively. Each of the first motor 110 and the second motor 120 may be supplied with current according to the current command value 330 and may apply the steering assist force.

If both the first motor 110 and the second motor 120 normally operate, the dual steering assist motor synchronizing apparatus 200 may not apply additional torque to the motor. That is, in the case that it is determined that the first motor RPM information 112 of the first motor 110 and the second motor RPM information 122 of the second motor 120 are identical in the abnormality occurrence determiner 220 of the dual steering assist motor synchronizing apparatus 200, the additional torque may not be applied since there is no abnormality in the steering assist motor.

However, if any one of the motors is delay driven, that is, if the abnormality occurs in any one of the motors, synchronization of the steering assist motor may be required. For example, if the first motor 110 is performing the delaying driving 111, synchronization of the steering assist motor may be required. The dual steering assist motor synchronizing apparatus 200 may apply the additional torque to the first motor 110 in delaying driving 111 based on steering angle speed information 320, the first motor RPM information 112 and second motor RPM information 122. The above example can be similarly applied to the case in which the second motor 120 is in delaying driving 111 like the first motor 110 and the first motor 110 is in normal driving 121 as the second motor 120.

According to the above embodiment, the dual steering assist motor synchronizing apparatus 200 may perform the synchronization of the dual steering assist motor by using the operation of the receiver 210, the abnormality occurrence determiner 220, the additional torque determiner 230 and the motor current controller 240 based on the RPM information of the steering assist motor, thereby it is possible to increase the steering feeling of the driver, to suppress the torque ripple, to increase the durability of the speed reducer connected to the steering assist motor.

The above embodiment is only one example of the dual steering assist motor synchronizing apparatus 200, and the configuration in which the dual steering assist motor synchronizing apparatus 200 can be operated in the vehicle is not limited to the above embodiment. In addition, the application of the above-described dual steering auxiliary motor synchronizing apparatus 200 in the vehicle system can be implemented on various EPS systems in a manner equivalent to the operation described above.

Figure 15:
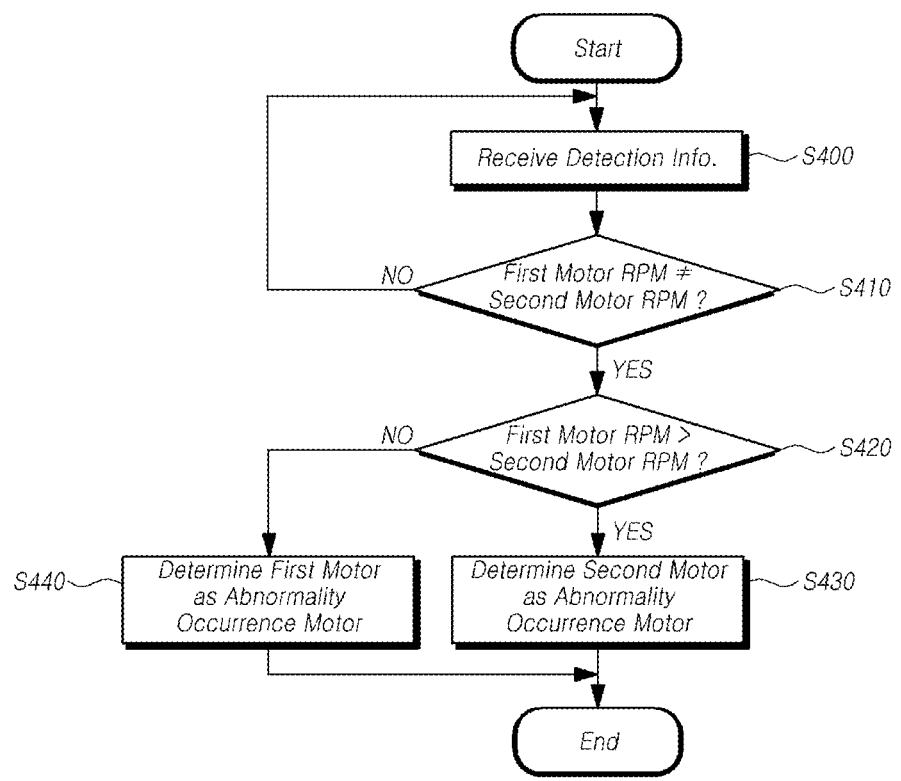
FIG. 15 is a diagram for explaining the operation of the abnormality occurrence determiner unit according to the present disclosure.

FIG. 15 is a diagram for explaining the operation of the abnormality occurrence determiner unit according to the present disclosure.

Referring to FIG. 15, the abnormality occurrence determiner 220 may determine the RPM synchronization of the first motor 110 and the second motor 120 according to the comparison result of the first motor RPM information 112 and the second motor RPM information 122, and determine the existence of an abnormality occurrence motor, and determines the abnormality occurrence motor.

More specifically, the abnormality occurrence determiner 220 may receive the first motor RPM information 112 and the second motor RPM information 122 from the receiver 210 (S400). Thereafter, the abnormality occurrence determiner 220 may confirm whether the first motor RPM information 112 and the second motor RPM information 122 are the same (S410). If the first motor RPM information 112 and the second motor RPM information 122 are the same, the abnormality occurrence determiner 220 determines that there is no abnormality occurrence motor in the abnormal state such as the delay driven state, and continuously monitor whether an abnormality has occurred (NO in step S410).

However, if the first motor RPM information 112 and the second motor RPM information 122 are different, the abnormality occurrence determiner 220 may determine that an abnormality occurrence motor in which an abnormality such as a delay drive has occurred exists. In this case, although the first motor RPM information 112 and the second motor RPM information 122 are different from each other, in consideration of the sensing information error in the receiving process or the error that may occur during the actual driving process of the motor, if there is only a small difference within the error range between the motor RPM information 112 and the second motor RPM information 122, the abnormality occurrence determiner 220 may determine that the first motor RPM information 112 and the second motor RPM information 122 are the same. In this case, the criterion for determining the identity of the RPM information 112, 122 of the two motors, that is, the error range, etc., can be determined in advance by user setting or design setting.

The abnormality occurrence determiner 220 may compare the first motor RPM information 112 and the second motor RPM information 122 to determine whether the first motor RPM information 112 exceeds the second motor RPM information 122 (S420). If it is determined in step S420 that the first motor RPM information 112 exceeds the second motor RPM information 122 (YES in step S420), the abnormality occurrence determiner 220 may determine the second motor 120 as the abnormality occurrence motor (S430). However, if it is determined in step S420 that the first motor RPM information 112 is smaller than the second motor RPM information 122 (NO in step S420), the abnormality occurrence determiner 220 may determine the first motor 110 as the abnormality occurrence motor (S440).

For example, if the RPM of the first motor 110 is 300 and the RPM of the second motor 120 is 300, the abnormality occurrence determiner 220 may determine that any abnormality has not occurred in both motors. However, if the RPM of the first motor 110 is 300 and the RPM of the second motor 120 is 400, the abnormality occurrence determiner 220 may compare the first motor RPM information 112 with the second motor RPM information 122 and may determine that an abnormality has occurred since the information is different. At this time, since the first motor RPM information 112 has a value less than that of the second motor RPM information 122, the first motor 110 may be determined as the abnormality occurrence motor. That is, the abnormality occurrence determiner 220 may determine the steering assist motor having the lower RPM information as the abnormality occurrence motor.

At this time, if any one of the steering assist motor RPM information has a lower value than the RPM information of the other steering assist motor, it means that the output of the steering assist motor having low RPM information is reduced due to an abnormal factor such as internal heat or the steering assist motor having low RPM information is delay driven. Alternatively, if the steering assist motor RPM information has a lower value than the RPM information of the other steering assist motor, it may mean that the steering assist motor having low RPM information is delayed driven due to the increase in disturbance or gear teeth clearance of the motor.

According to this manner, The abnormality determination unit 220 can determine whether the two steering assist motors are synchronized using the RPM information 112 and 122 of the first motor 110 and the second motor 120, and can determine the abnormality occurrence motor in which the abnormality has occurred based on the comparison result of the RPM information 112 and 122.

FIG. 16 is a diagram for explaining an example of the steering angle speed motor output matching table of the additional torque determiner according to the present disclosure.

If it is determined that an abnormality has occurred in any one of the first motor 110 and the second motor 120, the additional torque determiner 230 may determine the additional torque to be applied to the abnormality occurrence motor by using at least one of the steering angle speed motor output matching table information, the first motor RPM information 112, the second motor RPM information 122 and the steering angle speed information 320.

Referring to FIG. 16, the steering angle speed motor output matching table information may include normal motor output torque information and normal motor output RPM information mapped by the steering angle speed information 320 which may be generated in the vehicle. In this case, the normal motor output torque information may be a torque value output from the steering assist motor in the case that the steering assist motor normally operates according to the current command value of the EPS system. Likewise, the normal motor output RPM information may be the RPM value output from the steering assist motor in the case that the steering assist motor is normally driven according to the current command value of the EPS system.

Since the EPS system is a system for providing the steering assist force according to the driver's steering, the normal motor output torque information and the normal motor output RPM information to be outputted from the steering assist motor can be assigned according to the steering angle speed. The steering angle speed motor output matching table information of the additional torque determiner 230 may be a table in which the output information to be output from the steering assist motor is matched and assigned according to the steering angle speed information 320. In this case, the steering angle speed motor output matching table information may be a table or diagram corresponding to one steering assist motor or a plurality of steering assist motor, respectively. Furthermore, the steering angle speed motor output matching table information may not have the same value depending on the characteristics of the respective steering assist motors.

Furthermore, the steering angle speed motor output matching table information may be information to which normal motor output torque information and normal motor output RPM information are assigned according to the steering angle speed, but may also be information that varies depending on vehicle state information such as vehicle speed, steering angle, driver steering torque, and the like. For example, even in the case of the same steering angle speed, the required steering assist force may change depending on the vehicle speed, the steering angle, or the driver steering torque. Therefore, in the steering angle speed motor output matching table information, the normal motor output torque information and normal motor output RPM information may be determined by reflecting the vehicle state information.

Further, the steering angle speed motor output matching table information may have different values depending on the steering assist motor characteristics. The normal motor output torque information and the normal motor output RPM information according to the steering angle speed may be assigned differently for each motor by reflecting not only the vehicle state information but also the inherent hardware characteristics of the steering assist motor.

The steering angle speed motor output matching table information may be applied not only to normal motors but also to the abnormality occurrence motor. That is, the additional torque determiner 230 may determine the additional torque based on the steering angle speed motor output matching table information so that the RPM information output from the abnormality occurrence motor is matched with the normal motor output RPM information mapped to the steering angle speed information 320. As a result, the RPM information of the abnormality occurrence motor and the normal motor output RPM information may become the same, so that the two steering assist motors are synchronized.

According to the above embodiment, the dual steering assist motor synchronizing apparatus 200 may include the normal motor output RPM information and the normal motor output torque information for synchronizing the steering assist motor through the operation of the above described additional torque determiner 230.

The above embodiment is merely an example of assigning the normal motor output RPM information and the normal motor output torque information according to the steering angle speed in the steering angle speed motor output matching table information. Therefore, the method for assigning the normal motor output RPM information and the normal motor output torque information according to the steering angle speed in the steering angle speed motor output matching table information is not limited to the above described embodiment. Furthermore, the steering angle speed motor output matching table information may further reflect information such as the vehicle speed, the steering angle, or the driver steering torque as described above, and may further reflect the additional information required to determine the additional torque.

The steering angle speed motor output matching table information of the additional torque determiner 230 has been described above. Hereinafter, a specific method of determining the additional torque by the additional torque determiner 230 using the steering angle speed motor output matching table information will be described in detail with reference to FIG. 17.

Figure 17:
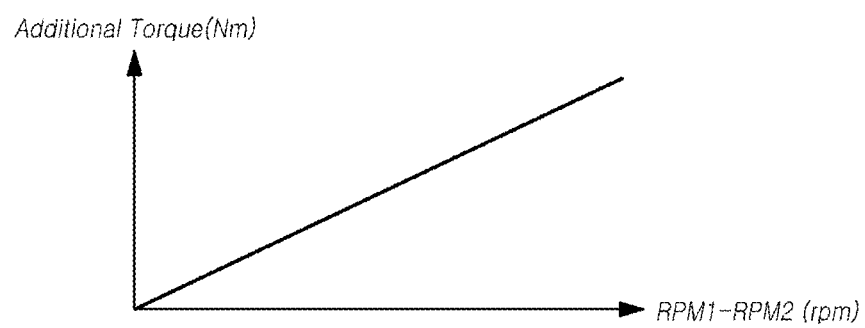
FIG. 17 is a diagram for explaining a method of determining additional torque based on RPM difference information in the additional torque determiner according to the present disclosure.

FIG. 17 is a diagram for explaining a method of determining additional torque based on RPM difference information in the additional torque determiner according to the present disclosure.

Referring to FIG. 17, the additional torque determiner 230 may verify the normal motor output RPM information and the normal motor output torque information corresponding to the steering angle speed information 320 by using the steering angle speed motor output matching table information of the abnormality occurrence motor, and may calculate RPM difference information which is a difference between the first motor RPM information 112 and the second motor RPM information 122, and may determine the additional torque based on the RPM difference information.

Here, the RPM difference information between the first motor RPM information 112 and the second motor RPM information 122 may mean the difference in the number of rotations due to the delayed driving of the steering assist motor. That is, the RPM difference information may be a value indicating the degree to which the delayed motor is delayed relative to the other motor. The additional torque determiner 230 according to the embodiment may perform synchronization between the abnormality occurrence motor and the normal operating motor by using the correction of the difference of the RPM information.

In addition, the additional torque determiner 230 may verify the normal motor output RPM information and the normal motor output torque information of the normal steering assist motor by using the steering angle speed motor output matching table, and may confirm whether or not the corresponding normal motor is outputting normal motor output RPM information and normal motor output torque information. If the normal steering assist motor does not output the normal motor output RPM information and the normal motor output torque information, the additional torque determiner 230 may determine the additional torque so that the normal steering assist motor has RPM or torque that matches with the normal motor output RPM information or the normal motor output torque information mapped to the steering angle speed information 320.

The additional torque determiner 230 may determine the additional torque in proportion to the RPM difference information of the first motor 110 and the second motor 120. To this end, the additional torque determiner 230 may determine the additional torque through a predetermined relational equation having at least one of the RPM difference information, the normal motor output RPM information, and the normal motor output torque information as variables. For example, after the additional torque determiner 230 calculates the RPM difference information, the additional torque determiner 230 may apply the predetermined relational equation between the calculated RPM difference information, the normal motor output RPM information and the normal motor output RPM information to calculate the additional torque to be applied to the abnormality occurrence motor.

In this case, the predetermined relational equation may be an equation for determining the additional torque as the value calculated by multiplying the value obtained by dividing the RPM difference information by the normal motor output RPM information into the normal motor output torque information. This can be expressed as an example using Equation (1).

$$\frac{|RPM1 - RPM2|}{RPMr} \times Tr = Tp \qquad \text{[Equation 1]}$$

Here, RPM 1 is the first motor RPM information 112, and RPM 2 is the second motor RPM information 122. RPMr is the normal motor output RPM value, Tr is the normal motor output torque value, and Tp is the additional torque value. That is, the additional torque determiner 230 may determine a value calculated by multiplying the value obtained by dividing the RPM difference information by the normal motor output RPM information into the normal motor output torque information as the additional torque.

The two motors are not synchronized with each other at a ratio equal to the RPM difference between the first motor 110 and the second motor 120 with respect to the normal motor output RPM information. Therefore, the value obtained by multiplying the corresponding ratio by the normal motor output torque information is applied to the abnormality occurrence motor as the additional torque so that both motors can be synchronized. Alternatively, the predetermined relational equation may be a relational equation in which a constant proportional coefficient is added to the above relational equation. This may be a relational expression reflecting the gain value for the actual driving generated based on the experiment. Alternatively, the predetermined relational equation may be relational equation further reflecting vehicle state information such as RPM difference information, steering angle speed, and vehicle speed to determine the additional torque.

For example, in the relational equation, the gain value as above can be varied according to the vehicle speed. For example, the gain value mapped to the vehicle speed information may be further included in Equation (1) so that additional torque may change depending on the vehicle speed. In addition, the predetermined relational equation may further reflect the information calculated from the steering angle speed motor output matching table information to perform synchronization of the steering assist motor.

Referring to FIG. 17, a graph corresponding to Equation (1) for additional torque calculation is presented. In this case, the horizontal axis represents RPM difference information between the first motor 110 and the second motor 120, and the vertical axis represents the determined additional torque. The larger the RPM difference information, the more delaying driving is performed by any of the steering assist motors. Therefore, the larger the RPM difference information, the greater the additional torque amount determined by the additional torque determiner 230.

Specifically, in the case that the RPM difference information has a value of about 20 rpm, and normal motor output RPM information and normal motor output torque information based on the steering angle speed information 320 in the steering angle speed motor output matching table information are 37.5 RPM and 4.77 Nm respectively, the additional torque determiner 230 may determine (20 RPM*4.77 Nm)/37.5 RPM=2.544 Nm as the additional torque according to Equation (1).

As in the above embodiment, the dual steering assist motor synchronizing apparatus 200 may determine the additional torque for synchronizing the steering assist motor through the operation of the above described additional torque determiner 230.

The above embodiment is only an example in which the additional torque determiner 230 determines the additional torque according to the RPM difference information, and the relation or method for determining the additional torque by the additional torque determiner 230 is not limited to this example. Further, the relational equation or method for determining the additional torque by the additional torque determiner 230 may be implemented by a predetermined relational equation as the above described method or as further including gain value, and may be implemented by various other relational expressions for performing the same function. To this end, the additional torque determiner 230 may utilize various information in the steering angle speed motor output matching table information.

As described with reference to FIGS. 13 to 17, in the EPS system according to the present disclosure, the synchronization of the dual steering assist motor can be performed based on the RPM information of the two steering assist motors, thereby the torque ripple can be suppressed, and the durability of the speed reducer connected to the steering assist motor can be increased.

Hereinafter, the synchronization method of the dual steering assist motor according to the present disclosure will be described with reference to the drawings.

Figure 18:
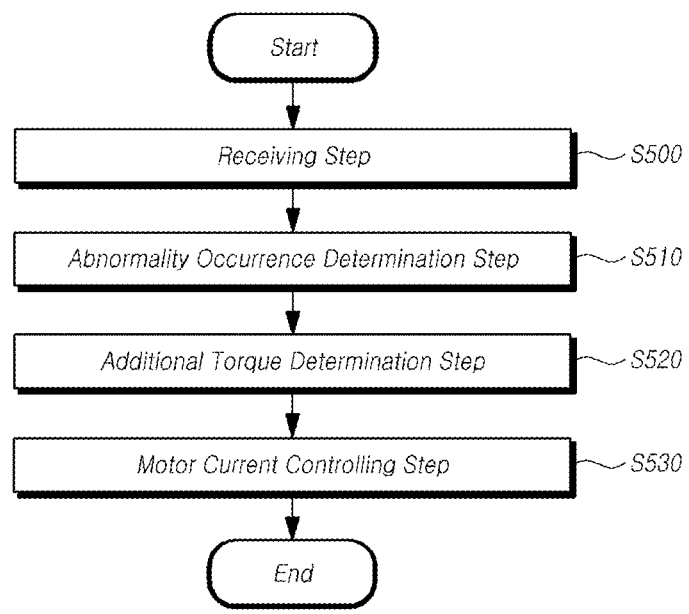
FIG. 18 is a diagram for explaining the operation of the dual steering assist motor synchronization method according to the present disclosure.

FIG. 18 is a diagram for explaining the operation of the dual steering assist motor synchronization method according to the present disclosure.

Referring to FIG. 18, the method for synchronizing the steering assist motor may include the receiving step S500 for receiving steering angle speed information 320, first motor RPM information 112 and second motor RPM information 122 for the first motor 110 and the second motor 120 as steering assist motors from a sensor mounted to the vehicle, the abnormality occurrence determination step S510 for determining the RPM synchronization of the first motor 110 and the second motor according 120 to the comparison result of the first motor RPM information 112 and the second motor RPM information 122, determining an existence of the abnormality occurrence motor, and determining the abnormality occurrence motor, the additional torque determination step S520 for determining, if it is determined that one of the first motor 110 and the second motor 120 is the abnormality occurrence motor, the additional torque to be applied to the abnormality occurrence motor based on at least one of steering angle speed motor output matching table information predetermined for each motor, the first motor RPM information 112, the second motor RPM information 122 or the steering angle speed information 320, and the motor current providing step S530 for controlling current to be applied to the abnormality occurrence motor based on the additional torque.

In the receiving step S500 of the dual steering assist motor synchronization method according to the embodiment, the steering angle speed information 320, the first motor RPM information 112 the second motor RPM information 122 for the first motor 110 and the second motor 110 are transmitted through the steering angle speed sensor or the RPM sensor of the steering assist motor installed in the vehicle. In this case, the RPM sensor of the steering assist motor may be the encoder installed in the motor. The encoder can detect the rotational speed and rotational direction of the first motor 110 and the second motor 120, and the like. Also, according to an exemplary embodiment, there may be a plurality of sensors configured inside or outside the vehicle for generating information received in the receiving step.

In addition, the above described sensor may be the preliminary sensor for a sensor error or sensor failure of the sensor in the vehicle. The steering angle speed information, the first motor RPM information 112 and the second motor RPM information 122 received in the receiving step may be not information directly received from the sensors but estimated value information calculated using another sensor.

Alternatively, in the receiving step, the steering angle speed information 320 or the RPM information may be calculated using the information received from the sensor described above. For example, in the receiving step, the driver steering angle speed information 320 may be estimated and utilized by using the RPM information received from the RPM sensor of the steering assist motor in the event of the failure or abnormality of the steering angle sensor.

According to another example, in the receiving step, if the RPM sensor of the steering assist motor malfunctions, RPM information of the steering assist motor may be estimated and utilized by using the received steering angle speed information 320. In addition, the information received in the receiving step according to an embodiment is not limited to the steering angle speed information 320 or the RPM information, and may include steering angle speed holding time information, driver steering torque information, steering assist motor torque information, and the like.

In the abnormality occurrence determination step S510 according to the embodiment, it may be determined RPM synchronization of the first motor 110 and the second motor according 120 to the comparison result of the first motor RPM information 112 and the second motor RPM information 122, and the existence of the abnormality occurrence motor and the abnormality occurrence motor may be determined.

That is, in the EPS system using the dual steering assist motor, the steering assist force according to the driver's steering may be provided by both motors, and each of the two steering assist motors may provide half of the output for the steering assist force. Therefore, the abnormality occurrence determiner 220 may compare the RPM information of the two motors, and determine the steering assist motor having less RPM information as the abnormality occurrence motor.

As an example, in the abnormality occurrence determination step, the first motor RPM information 112 and the second motor RPM information 122 are compared. If any one of the RPM information has a value smaller than the other one, the steering assist motor corresponding to the RPM information having the small value may be determined as the abnormality occurrence motor.

That is, in the abnormality occurrence determination step, if it is determined that the first motor RPM information 112 exceeds the second motor RPM information 122, the second motor 120 may be determined to be the abnormality occurrence motor, and if it is determined that the first motor RPM information 112 is less than the second motor RPM information 122, the first motor 110 may be determined as the abnormality occurrence motor.

At this time, if any one of the steering assist motor RPM information has a lower value than the RPM information of the other steering assist motor, it means that the output of the steering assist motor having low RPM information is reduced due to an abnormal factor such as internal heat or the steering assist motor having low RPM information is delay driven. Alternatively, if the steering assist motor RPM information has a lower value than the RPM information of the other steering assist motor, it may mean that the steering assist motor having low RPM information is delayed driven due to the increase in disturbance or gear teeth clearance of the motor.

In the additional torque determination step S520, if it is determined that one of the first motor 110 and the second motor 120 is the abnormality occurrence motor, the additional torque to be applied to the abnormality occurrence motor may be determined based on at least one of steering angle speed motor output matching table information predetermined for each motor, the first motor RPM information 112, the second motor RPM information 122 or the steering angle speed information 320.

That is, according to the additional torque determination step, based on the torque information of the motor, the RPM information of the motor to be outputted when there is no abnormality in the steering assist motor, and the detected RPM information of both motors, it may be further applied the additional torque corresponding to the difference between the torque to be applied in the absence of abnormality and the actual generated torque to the abnormality occurrence motor. This allows the method according to present disclosure to perform synchronization of both motors, since the RPM of the two steering assist motors can be maintained at the same value.

At this time, the steering angle speed motor output matching table information in the additional torque determination step may include normal motor output torque information and normal motor output RPM information mapped by each steering angle speed which may be generated in the vehicle.

Since the EPS system is a system for providing the steering assist force according to the driver's steering, the normal motor output torque information and the normal motor output RPM information to be outputted from the steering assist motor can be assigned according to the steering angle speed. the steering angle speed motor output matching table information in the additional torque determination step may be a table in which the output information to be output from the steering assist motor is matched and assigned according to the steering angle speed information.

In this case, the output information to be output from the steering assist motor in accordance with the steering angle speed information may differ depending on the characteristics of the steering assist motor, so that the steering angle speed motor output matching table information may differ depending on the characteristics of the steering assist motor.

In the additional torque determination step S520 according to one embodiment, the additional torque may be determined such that the RPM information output from the abnormality occurrence motor is matched with the normal motor output RPM information mapped to the steering angle speed information based on the steering angle speed motor output matching table information. As a result, the RPM information of the abnormality occurrence motor and the normal motor become the same, so that the dual steering assist motor synchronizing method can synchronize the two steering assist motors.

In the additional torque determination step S520 according to one embodiment, it may be configured to verify the normal motor output RPM information and the normal motor output torque information corresponding to the steering angle speed information using the steering angle speed motor output matching table information of the abnormality occurrence motor, and to calculate RPM difference information which is a difference between the first motor RPM information and the second motor RPM information and determines the additional torque based on the RPM difference information.

In one embodiment, in the additional torque determination step S520 according to one embodiment, it may be determined the additional torque that may be the normal motor output RPM information and the normal motor output torque information based on the RPM difference information. In this way, the RPM synchronization of the abnormality occurrence motor and the normal motor can be performed by using the difference information between the abnormality occurrence motor and the normal motor.

For example, in the additional torque determination step S520 according to one embodiment, the additional torque can be determined as the value multiplying the value obtained by dividing the RPM difference information by the normal motor output RPM information into the normal motor output torque information. Alternatively, in the additional torque determination step S520 according to one embodiment, the additional torque may be determined by using a predetermined relational function having at least one of the RPM difference information, the normal motor output RPM information, and the normal motor output torque information as the variables.

In the motor current providing step S530, the current to be applied to the abnormality occurrence motor may be controlled based on the additional torque. Since the additional torque to be applied to the steering assist motor is determined in the additional torque determination step S520 according to one embodiment, the current is applied to the abnormality occurrence motor so as to directly synchronize the two steering assist motors in the motor current providing step S530.

In this case, in the motor current providing step S530 according to the embodiment, the additional torque may be converted into an additional current to be applied to the abnormality occurrence motor by using a predetermined conversion value for the vehicle and the additional current may be supplied to the abnormality occurrence motor.

In the additional torque determination step S520 according to the embodiment, the additional torque of the steering assist motor may be determined by using the unit of the torque amount. Therefore, in the motor current providing step S530 according to the embodiment, it is required to convert the additional torque into an amount of current to supply the current to the steering assist motor based on the inherent characteristics of the steering assist motor and the inherent characteristics of the vehicle. According to this manner, in the motor current providing step S530 according to the embodiment, the two steering assist motors may be synchronized by matching the RPM information and the torque information of the abnormality occurrence motor with the normal motor output torque information and the normal motor output RPM information.

The receiving step, the abnormality occurrence determination step, the additional torque determination step, and the motor current controlling step of the dual steering assist motor synchronization method may be implemented by one or more microprocessors operated by the specific program. The program may include a series of commands for performing each step in the dual steering assist motor synchronizing apparatus according to one embodiment.

The terms "system", "processor", "controller", "component", "module", "interface", "model", "unit" may refer to the computer-related hardware, a combination of hardware and software, software, or software in execution. For example, the above-described components may be, but are not limited to, a process driven by a processor, a processor, a controller, a control processor, an entity, an execution thread, a program and/or a computer. For example, a controller or an application running on a processor and a controller or processor may both be components. One or more components may reside within a process and/or thread of execution and the components may reside in one system or be distributed to more than one system.

The above described present disclosure can be implemented as computer-readable code on a medium on which a program is recorded. The computer readable medium includes all kinds of recording devices in which data that can be read by a computer system is stored. Examples of the computer readable medium include a hard disk drive (HDD), a solid state disk (SSD), a silicon disk drive (SDD), a ROM, a RAM, a CD-ROM, a magnetic tape, a floppy disk, And may also be implemented in the form of a carrier wave (e.g., transmission over the Internet).

The above description and the accompanying drawings provide an example of the technical idea of the present invention for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure. In addition, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An electric power steering apparatus comprising:
 a first motor configured to provide a force for movement of a rack;
 a second motor configured to provide a force for movement of the rack in synchronized with the first motor;
 a torque angle sensor configured to detect a torque value and a steering angle according to a steering of a steering wheel;
 at least one sensor configured to detect an operation state of the first motor and an operation state of the second motor; and
 a controller configured to control an operation of the first motor and the second motor in accordance with the steering of the steering wheel and to control the operation of the first motor and the second motor based on the torque value, the steering angle, the operation state of the first motor and the operation state of the second motor.

2. The electric power steering apparatus of claim 1, wherein each of the first motor and the second motor is operable to transmit a force to a ball screw of a second reducer having a power transmission structure using the ball screw and a ball nut through a first reducer having a power transmission structure by an engagement of a worm and a worm wheel, so that the force is transmitted to the rack.

3. The electric power steering apparatus of claim 1, wherein the controller drives only the first motor by increasing an assist torque for the first motor if only the first motor among the first motor and the second motor is required to be driven according to the torque value and the steering angle.

4. The electric power steering apparatus of claim 1, wherein the controller is operable to drive the second motor by ramping up or exponentially increasing the current applied to the second motor if it is detected that the operation state of the first motor is abnormal.

5. The electric power steering apparatus of claim 1, wherein the controller is operable to drive the second motor by ramping up or exponentially increasing the current applied to the second motor if output of the first motor is extinguished.

6. The electric power steering apparatus of claim 1, wherein the controller is operable to, if output of one of the first motor and the second motor is reduced, ramps up or exponentially increase the current applied to the other motor whose output is not reduced thereby increasing the output of the other motor.

7. A control method of an electric power steering apparatus comprising:
 operating a first motor for providing a force for movement of a rack and a second motor for providing a force for movement of the rack in synchronized with the first motor;
 detecting a torque value and a steering angle according to a steering of a steering wheel;
 detecting an operation state of the first motor and an operation state of the second motor; and
 controlling an operation of the first motor and the second motor based on the torque value, the steering angle, the operation state of the first motor and the operation state of the second motor.

8. The control method of the electric power steering apparatus of claim 7,
 wherein the controlling the operation of the first motor and the second motor is configured to
 drive only the first motor by increasing an assist torque for the first motor if only the first motor among the first motor and the second motor is required to be driven according to the torque value and the steering angle.

9. The control method the electric power steering apparatus of claim 7,
 wherein the controlling the operation of the first motor and the second motor is configured to drive the second motor by ramping up or exponentially increasing the current applied to the second motor if it is detected that the operation state of the first motor is abnormal.

10. The control method of the electric power steering apparatus of claim 7,
wherein the controlling the operation of the first motor and the second motor is configured to
drive the second motor by ramping up or exponentially increasing the current applied to the second motor if output of the first motor is extinguished.

11. The control method of the electric power steering apparatus of claim 7,
wherein the controlling the operation of the first motor and the second motor is configured to,
if output of one of the first motor and the second motor is reduced, ramps up or exponentially increase the current applied to the other motor whose output is not reduced thereby increasing the output of the other motor.

12. An apparatus for synchronizing a steering assist motor comprising:
a receiver configured to receive a steering angle speed information, a first motor RPM information and a second motor RPM information for a first motor and a second motor as steering assist motors from a sensor mounted to a vehicle;
an abnormality occurrence determiner configured to determine an RPM synchronization of the first motor and the second motor according to a comparison result of the first motor RPM information and the second motor RPM information, to determine an existence of an abnormality occurrence motor, and to determines the abnormality occurrence motor;
an additional torque determiner configured to determine, if one of the first motor and the second motor is the abnormality occurrence motor, an additional torque to be applied to the abnormality occurrence motor based on at least one of steering angle speed motor output matching table information predetermined for each motor, the first motor RPM information, the second motor RPM information or the steering angle speed information; and
a motor current controller configured to control a current to be applied to the abnormality occurrence motor based on the additional torque.

13. The apparatus for synchronizing the steering assist motor of claim 12,
wherein the abnormality occurrence determiner determines the second motor to be the abnormality occurrence motor if the first motor RPM information exceeds the second motor RPM information, and
the abnormality occurrence determiner determines the first motor to be the abnormality occurrence motor if the first motor RPM information is less than the second motor RPM information.

14. The apparatus for synchronizing the steering assist motor of claim 12,
wherein the steering angle speed motor output matching table information includes a normal motor output torque information and a normal motor output RPM information mapped by each steering angle speed which may be generated in the vehicle.

15. The apparatus for synchronizing the steering assist motor of claim 14,
wherein the additional torque determiner determines the additional torque based on the steering angle speed motor output matching table information so that the RPM information output from the abnormality occurrence motor is matched with the normal motor output RPM information mapped to the steering angle speed.

16. The apparatus for synchronizing the steering assist motor of claim 15,
wherein the additional torque determiner verifies the normal motor output RPM information and the normal motor output torque information corresponding to the steering angle speed information using the steering angle speed motor output matching table information of the abnormality occurrence motor,
the additional torque determiner calculates an RPM difference information which is a difference between the first motor RPM information and the second motor RPM information and determines the additional torque based on the RPM difference information.

17. The apparatus for synchronizing the steering assist motor of claim 16,
wherein the additional torque determiner determines the additional torque as a value multiplying the value obtained by dividing the RPM difference information by the normal motor output RPM information into the normal motor output torque information.

18. The apparatus for synchronizing the steering assist motor of claim 12,
wherein the motor current controller controls to convert the additional torque into an additional current to be applied to the abnormality occurrence motor by using a predetermined conversion value for the vehicle and supply the additional current to the abnormality occurrence motor.

19. A method for synchronizing a steering assist motor comprising:
Receiving a steering angle speed information, a first motor RPM information and a second motor RPM information for a first motor and a second motor as steering assist motors from a sensor mounted to a vehicle;
determining an RPM synchronization of the first motor and the second motor according to a comparison result of the first motor RPM information and the second motor RPM information, determining an existence of an abnormality occurrence motor, and determining the abnormality occurrence motor;
determining, if one of the first motor and the second motor is the abnormality occurrence motor, an additional torque to be applied to the abnormality occurrence motor based on at least one of steering angle speed motor output matching table information predetermined for each motor, the first motor RPM information, the second motor RPM information or the steering angle speed information; and
controlling current to be applied to the abnormality occurrence motor based on the additional torque.

20. The method apparatus for synchronizing the steering assist motor of claim 19, wherein the steering angle speed motor output matching table information includes a normal motor output torque information and a normal motor output RPM information mapped by each steering angle speed which may be generated in the vehicle, and
the determining the additional torque further comprising:
verifying the normal motor output RPM information and the normal motor output torque information corresponding to the steering angle speed information using the steering angle speed motor output matching table information of the abnormality occurrence motor;

calculating an RPM difference information which is a difference between the first motor RPM information and the second motor RPM information; and determining the additional torque based on the RPM difference information.

* * * * *